United States Patent
Godlewski et al.

(10) Patent No.: US 7,734,369 B2
(45) Date of Patent: *Jun. 8, 2010

(54) SYSTEMS AND METHODS FOR PURCHASING, INVOICING AND DISTRIBUTING ITEMS

(75) Inventors: Peter Godlewski, San Carlos, CA (US); John Higham, Menlo Park, CA (US)

(73) Assignee: Nexiant, Lake Forest, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/478,556

(22) Filed: Jun. 28, 2006

(65) Prior Publication Data

US 2007/0050272 A1 Mar. 1, 2007

Related U.S. Application Data

(63) Continuation of application No. 09/624,154, filed on Jul. 24, 2000, now Pat. No. 7,072,855.

(51) Int. Cl.
*G06F 7/00* (2006.01)
*G06F 17/00* (2006.01)
*G06Q 10/00* (2006.01)
*G06G 1/14* (2006.01)

(52) U.S. Cl. ............... 700/216; 700/244; 700/241; 700/236; 700/231; 705/22; 705/28

(58) Field of Classification Search .......... None
See application file for complete search history.

(56) References Cited

U.S. PATENT DOCUMENTS

| | | | | | |
|---|---|---|---|---|---|
| 5,844,808 | A | * | 12/1998 | Konsmo et al. | 700/244 |
| 5,930,771 | A | * | 7/1999 | Stapp | 705/28 |
| 5,963,452 | A | * | 10/1999 | Etoh et al. | 700/236 |
| 6,181,981 | B1 | * | 1/2001 | Varga et al. | 700/236 |
| 6,341,271 | B1 | * | 1/2002 | Salvo et al. | 705/28 |
| 6,397,126 | B1 | * | 5/2002 | Nelson | 700/236 |
| 6,418,416 | B1 | * | 7/2002 | Rosenberg et al. | 705/28 |
| 6,606,602 | B1 | * | 8/2003 | Kolls | 705/14 |
| 6,697,704 | B2 | * | 2/2004 | Rosenblum | 700/232 |
| 6,892,941 | B2 | * | 5/2005 | Rosenblum | 235/383 |
| 6,980,887 | B2 | * | 12/2005 | Varga et al. | 700/236 |
| 7,072,855 | B1 | * | 7/2006 | Godlewski et al. | 705/22 |
| 7,083,036 | B2 | * | 8/2006 | Adams | 194/223 |
| 7,089,322 | B1 | * | 8/2006 | Stallmann | 709/238 |
| 7,181,501 | B2 | * | 2/2007 | Defosse | 709/217 |
| 2002/0161475 | A1 | * | 10/2002 | Varga et al. | 700/231 |

* cited by examiner

*Primary Examiner*—F. Ryan Zeender
*Assistant Examiner*—Mussa Shaawat
(74) *Attorney, Agent, or Firm*—Townsend and Townsend and Crew LLP (57) ABSTRACT

A method for supplying items to dispensing units that hold at least one type of item and a record of inventory levels comprises periodically sending restocking information from the dispensing units over a network to a server computer. Ordering information is generated for the items to be restocked based on the restocking information. The ordering information is electronically sent to one or more supplier computers to order items to be restocked into the dispensing units.

17 Claims, 13 Drawing Sheets

SYSTEMS AND METHODS FOR PURCHASING, INVOICING AND DISTRIBUTING ITEMS

BACKGROUND OF THE INVENTION

This invention relates generally to the field of inventory systems, and in particular to inventory systems having point of use dispensers. More specifically, the invention relates to automated techniques for reordering items (or ordering new items) for the dispensers, filling the orders, confirming receipt of the orders and providing payment. The invention also relates to techniques for integrating the ordering and payment processes of such inventory systems with existing accounting systems to make the overall business process more versatile and efficient.

The ability to effectively and efficiently supply items to end users is an important part of today's world economy. Common types of supply items that are of interest to the invention include manufacturing, repair and operational (MRO) supplies among others. As inventory levels of such items become low, a reordering process may be used to replenish the items. This process involves determining the types and quantities of items to reorder, as well as suppliers of the items. For example, a business establishment may wish to replenish its shelves with par levels of the same types of items. In some cases, however, a replacement item may be desired. Further, the establishment may wish to change suppliers due to poor service, excessive prices, or the like. Unfortunately, the ability to track inventory levels, as well as to identify suppliers having the ability to timely supply requested items at an acceptable price can be challenging.

The reordering process may also involve a business's accounting department. For example, the accounting department may be responsible for taking a written reorder request and generating a written purchase order which is then sent to a supplier, e.g., by mail or facsimile. Since the accounting department generates and sends the purchase order, it is difficult to perform an independent review of the purchase order in order to confirm the order or change the order prior to sending. Further, it is difficult to identify other suppliers that may be able to ship the items sooner and/or at a lower price.

Once the supplier receives a purchase order, the supplier attempts to fill the order. However, in some cases, the supplier may not have an adequate supply of the requested items. As a result, the missing items may be placed on back order, and the available items shipped against the purchase order. When the end user receives a shipment, the end user must confirm receipt and notify the accounting department. This is often accomplished by having a dock worker signing a receipt from the supplier when the items are unloaded. This receipt is then manually sent to the accounting department for payment.

Such a process is challenging to the accounting department who must reconcile the items shipped with the items ordered. Further, the warehouse must update their inventory levels to make sure that the shelves have a par level of each of the items. This can be challenging when working from a signed receipt, especially when only a partial shipment is received.

Hence, this invention is related to inventory systems that utilize point of use dispensers that have the ability to maintain a record of current inventory levels. The invention is also related to techniques for the automated ordering of items, confirming the receipt of an order, and generating payment. The invention is further related to techniques for identifying alternative suppliers and for integrating the ordering process with existing accounting systems to provide he ability to review a purchase order and to approve and/or alter the purchase order before being sent to a supplier.

SUMMARY OF THE INVENTION

In one embodiment, a method is provided for supplying items to a plurality of dispensing units. The method utilizes a plurality of dispensing units that each hold a plurality of at least one type of item. Conveniently, these items may be held on a consignment basis. Further, the units each have a processor and a memory for storing a record of inventory levels of each item and transaction information. Periodically, restocking information that includes a restock quantity for each item is sent from the dispensing units over a network to a server computer. Ordering information for the items to be restocked is then generated based on the restocking information, and the ordering information is electronically sent to one or more supplier computers to order items to be restocked into the dispensing units.

Conveniently, the server computer may be used to poll the dispensing units over the network to obtain the quantities of the items to be restocked. Further, the server computer may be used to generate the ordering information by determining supplier information for the items to be ordered.

In one particular aspect, the ordering information is electronically sent from the server computer to an application computer having a hosted procurement application. In this way, the hosted procurement application may be accessed to view the ordering information. For example, a user may remotely access the hosted procurement application using any type of user computer that is connectable over a network, such as the Internet, to view the ordering information on a display screen. Conveniently, the user computer may include a web browser to view one or more pages on the display screen and to permit the ordering information to be approved, modified or canceled. As one specific example, the user may select other suppliers and/or manufacturers for the items to be restocked. This may be accomplished, for example, by electronically posting a list of suppliers as well as manufactures of items carried by the suppliers and their associated prices to permit manual selection of the suppliers and manufacturers. As another example, the hosted procurement application may be used to electronically post desired items and quantities to permit suppliers to provide electronic quotes for supplying the items. In some cases, the user may wish to order items that are not currently stocked in the dispensing units. Conveniently, the hosted procurement application may also be used to order items that are not on the aggregated demand list.

In another aspect, the ordering information may be sent from the hosted procurement application to an electronic requisition and purchasing system which is used to generate one or more electronic purchase order numbers and to electronically send the purchase order numbers back to the hosted procurement application. The hosted procurement application may then be used to electronically send the purchase order numbers and the supplier information to a business portal computer. In turn, the business portal computer may be used to electronically send the purchase order numbers to various supplier computers for order fulfillment.

In another particular aspect, the supplier may electronically send an advanced shipping notice to the business portal computer, which may then be forward on to the server computer via the hosted procurement application. The advanced shipping notice includes information on items to be shipped, their quantities and a date of shipment. For example, in some cases, some of the ordered items may not be in stock and will need to be backordered. The advanced shipping notice may contain this type of information. The server computer may then electronically send information contained in the advanced shipping notice to the dispensing units to apprise the dispensing units of the items and quantities that are to be shipped for restocking into the dispensing units. In cases where the ordered items are not intended to be placed into a dispensing unit, information contained in the advanced shipping notice may be electronically sent from the hosted procurement application to the user computer.

Following shipment of the items listed in the advanced shipping notice, the items may be restocked into the dispensing units, and a record may be produced indicating the items that were actually received in the shipment and restocked into the dispensing units. Conveniently, the dispensing units may be restocked by simply pressing a restock button on the dispensing unit. Since the dispensing unit processor has a record of items to be restocked (from the advanced shipping notice), the shipped items may simply be placed into the dispensing unit. A corresponding item button is touched once for each item placed into the dispensing unit to record what items were actually shipped and once again to acknowledge that the quantity restocked is the same as the quantity contained in the record from the advance shipping notice. The dispensing units may then be used to reconcile the restocked items with the advanced shipping notice, and to electronically send a confirmation receipt to the server computer. The electronic receipt may then be forwarded from the server computer to the suppliers and to the electronic requisition and purchasing system. Using the electronic receipt, an electronic invoice may be generated by the supplier and may be electronically sent to the business portal computer and the hosted procurement application. Based on the electronic invoice, the electronic requisition and purchasing system may be used to generate payment for each supplier.

In another embodiment, the invention provides an exemplary system for supplying items to a plurality of dispensing units that each hold a plurality of at least one type of item. Optionally, these items may be held on a consignment basis The dispensing units also have a processor and a memory for storing a record of inventory levels of each item. The system includes a server computer that is connectable to the dispensing units over a network to permit restocking information to be transmitted from the dispensing units to the server computer. The server computer is configured to generate ordering information for the items to be restocked based on the restocking information, and to electronically send the ordering information to one or more supplier computers to order items to be restocked into the dispensing units.

In one aspect, the server computer is configured to periodically poll the dispensing units over the network to obtain the quantities of the items to be restocked. The server computer may also be configured to associate suppliers with the items to be ordered. The server computer may then be used to electronically send the ordering information to an application computer having a hosted procurement application.

Conveniently, a user computer having a display screen may be used to access the hosted procurement application to view the ordering information on the display screen. Further, the hosted procurement application may be used to produce one or more pages on the display screen of the user computer to permit the ordering information to be approved, modified or canceled.

The application computer may be used to send the approved ordering information to an electronic requisition and purchasing system that is configured to generate one or more electronic purchase order numbers and to electronically send the purchase order number to the application computer. The application computer may further be configured to electronically send the purchase order number and the supplier information to a business portal computer that is configured to electronically send the purchase order number to the supplier computer based on the supplier information.

In one aspect, the supplier computer may be configured to electronically send an advanced shipping notice to the business portal computer for transmittance to the server computer. The advanced shipping notice may include information on items to be shipped, their quantities and a date of shipment. In another aspect, the application computer may include code to electronically send information contained in the advanced shipping notice to the user computer for items that are not stocked in the dispensing units. In still another aspect, the server computer may include code to electronically send information contained in the advanced shipping notice to the dispensing units to apprise the dispensing units of the items and quantities to be shipped for restocking into the dispensing units.

In one aspect of the system, the dispensing units may be configured to reconcile any restocked items with the advanced shipping notice and to electronically send a confirmation receipt to the server computer. The server computer may include code to electronically send the receipt to the supplier computers and to the electronic requisition and purchasing system. With such a configuration, the supplier computers may include code to generate an electronic invoice based on the receipt, and to electronically send the invoice to the business portal computer and the application computer. The application computer may then be configured to electronically transmit the electronic invoice to the electronic requisition and purchasing system for payment generation.

In yet another embodiment, the invention provides a hosted procurement application that comprises a computer readable medium having ordering information on items and quantities to be stocked into a plurality of dispensing units. The ordering information includes suppliers of the items. The hosted procurement application further includes code to permit access to the ordering information over a network such that the ordering information may be approved, modified, or canceled over the network. Code is also provided to transmit the ordering information to an electronic accounting system to generate an electronic purchase order.

DESCRIPTION OF THE SPECIFIC EMBODIMENTS

The invention provides systems and methods for replenishing supplies in an automated manner. For example, the invention may be used to automatically reorder supplies based on the mere act of removing the supplies from a storage location. Conveniently, the invention may be used to automatically determine an aggregated demand list for supplies held in a variety of locations, such as dispensers, storage sites, and the like. The aggregated demand list may then be used with an automated system to reorder the supplies.

The invention provides the opportunity to apply work flow rules (approval rules) to requisition the supplies. For example, prior to ordering the opportunity is provided to receive a purchase order, to review the purchase order, and then to acknowledge or change the order. For instance, a different supplier may be selected or the type of item may be changed. After a supplier receives the order, the supplier may send an advanced shipping notice to permit synchronization of replenished supplies with the quantities ordered. Further, acknowledgment of the shipped quantities may be made through use of an 855 type purchase order acknowledgment. Once the acknowledgment is made, the supplier may generate an electronic invoice to permit automated payment.

The invention may be used with essentially any type of item or supply. Merely by way of example, the invention may be used with manufacturer, repair and operations (MRO) supplies, medical and pharmaceutical supplies, and the like. Further, these supplies may be stored at any location or within any cabinet or dispensing device having the ability to maintain an electronic record of item removal and replacement.

One way to dispense items, such as MRO supplies, is by the use of dispensing units that have the ability to maintain a record of inventory levels. For example, the dispensing unit may have touch buttons or other sensors that record removal and/or replacement of items into the dispensing unit. The dispensing units also include a processor and an associated memory to record inventory levels. Conveniently, the dispensing units may be coupled to a network to permit inventory tracking for a group of dispensing units. Examples of dispensing units that may be used with the invention include those described in U.S. Pat. Nos. 5,805,455; 5,80,456; 5,745,366; 5,905,653; 5,927,540; 6,039,467; and PCT application Nos. 94/07841 and 97/22379, the complete disclosures of which are herein incorporated by reference. However, the invention is not intended to be limited to only such dispensing units.

Figure 1:
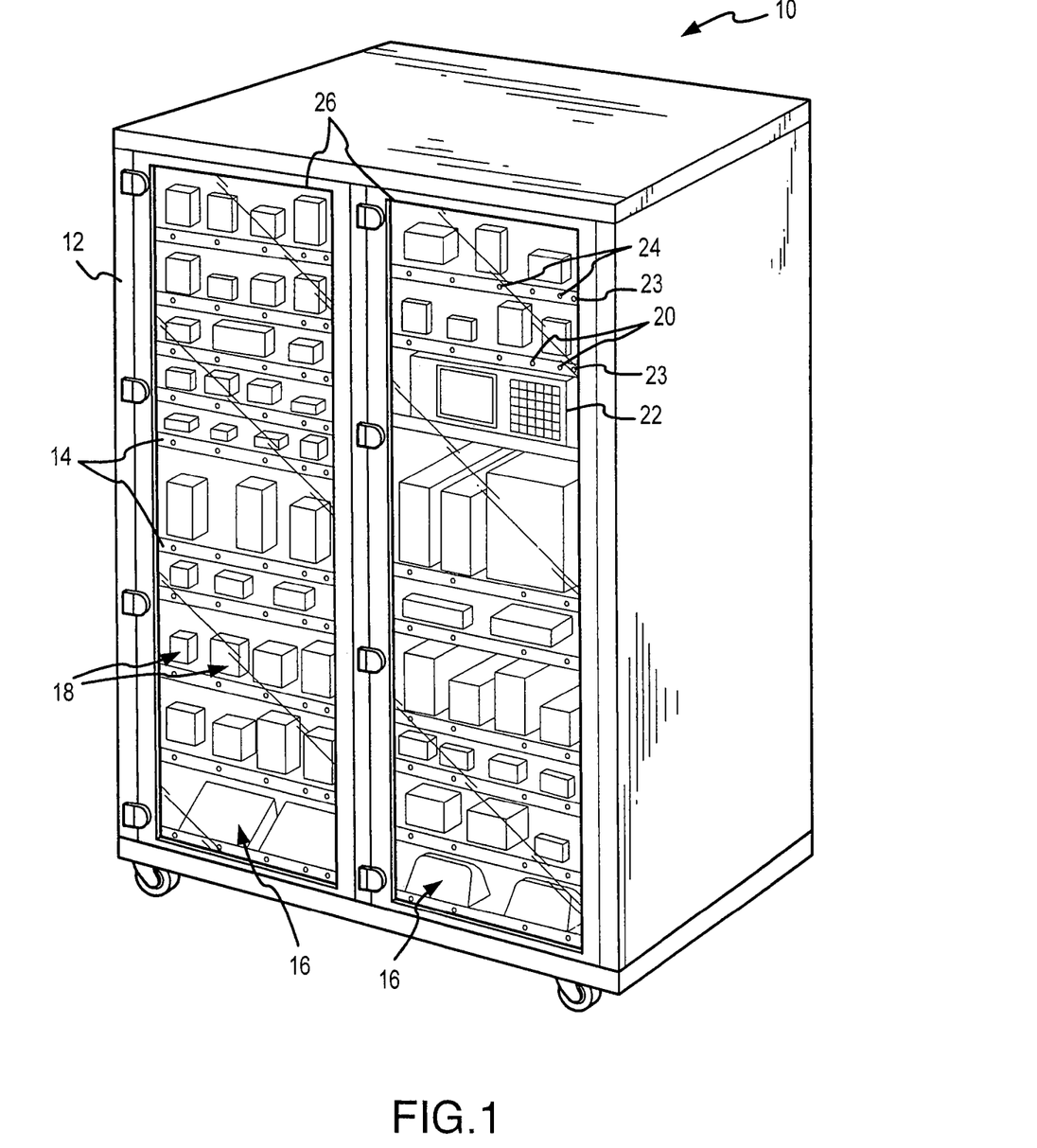
FIG. 1 is a perspective view of one embodiment of a dispensing unit that may be used in tracking inventory levels according to the invention.

One embodiment of such a dispensing unit is shown in FIG. 1. Briefly, the dispensing unit 10 includes an enclosure 12 and a plurality of adjustable shelves 14. Optionally, the enclosure 12 can be divided into a plurality of compartments 16 to increase the number of shelves 14 that can be disposed in the enclosure 12. Each shelf 14 can be further subdivided to form a plurality of storage locations 18. Disposed on the shelves 14 and near each storage location 18 are touch-sensitive buttons 20. The buttons 20 are connected to a processor 22 which receives signals from the buttons 20 when actuated.

The buttons 20 are disposed on the shelves 14 so that each storage location 18 is associated with a button 20. When an item is to be placed in or removed from a shelf 14, the button 20 in close proximity to the storage location 18 holding the item is actuated. Actuation of the button 20 sends a signal to the processor 22 to record removal of an item from or placement of an item into that particular storage location 18.

A return item button 23 is disposed at the end of each shelf 14. Actuation of the return item button 23 sends a signal to the processor 22 to place the buttons 20 on that particular shelf 14 in a credit mode. An item can then be returned to one of the storage locations 18 on that particular shelf 14, and the associated button 20 depressed to record replacement of the item.

A plurality of visual indicators 24 are also disposed on the shelves and near each of the buttons 20 so that each button 20 has a corresponding visual indicator 24. If the user presses a button 20 to send a signal to processor 22 that the user is removing an item, the corresponding visual indicator 24 lights to provide visual confirmation of the removal of the item. The visual indicators 24 are also used to assist in locating an item to be removed from the dispensing unit 10. The processor 22 contains a list of all of the items held in the dispensing unit 10. From this list, a user can select the desired item the user wishes to locate by entering the selection into the processor 22. The visual indicator corresponding to the selected item will flash directing the user to the item. In another removal method, a user can select the desired item and quantity to be removed by entering the selection into the processor 22. The processor 22 then sends a signal to actuate the visual indicator 24 in close proximity to the storage location 18 having the item.

The dispensing unit further includes a plurality of doors 26 which can be used to provide security for the items held in the unit 10. The doors 26 are preferably transparent and can be locked to prevent access to the items in the unit.

Figure 2:
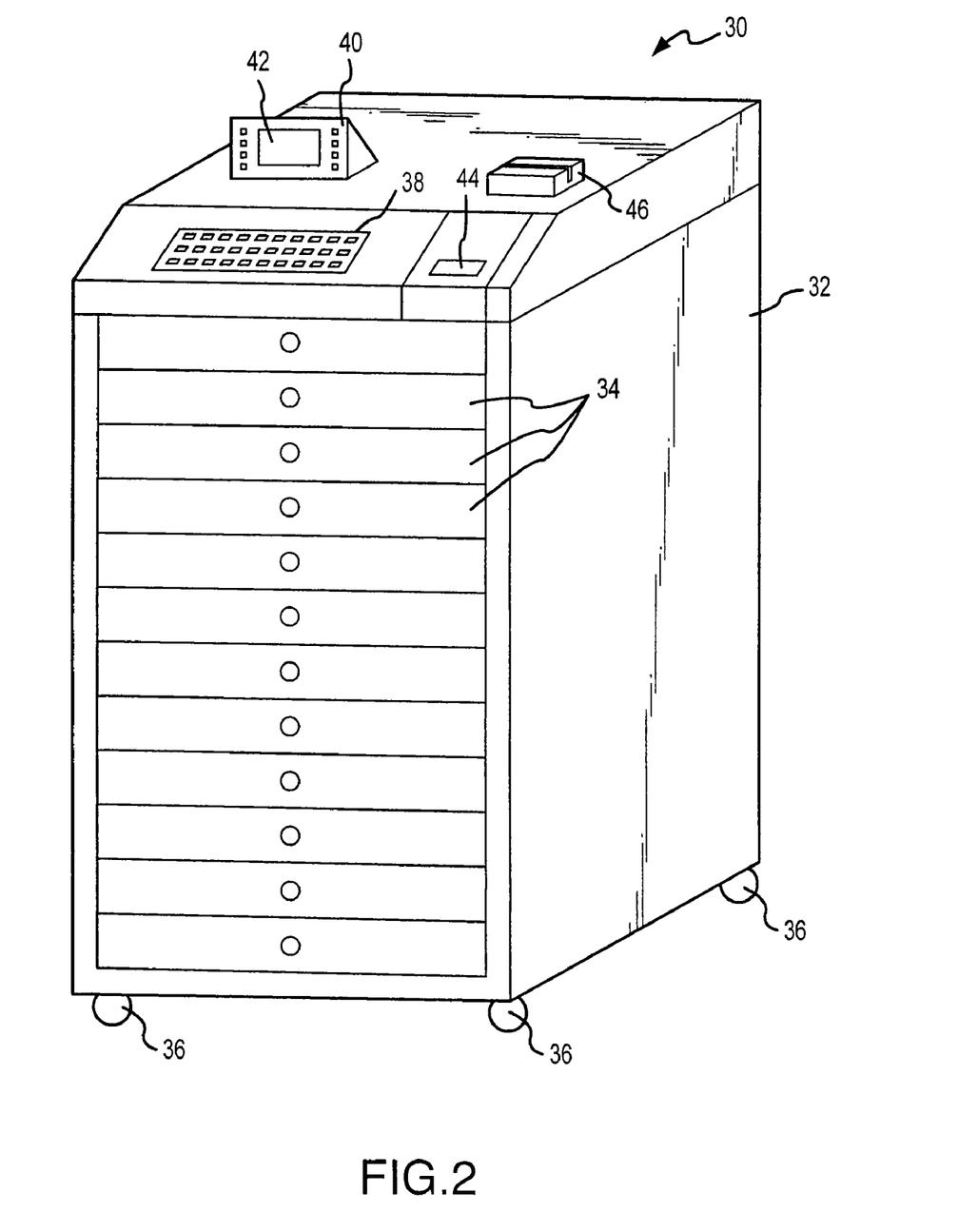
FIG. 2 is a perspective view of an alternative dispensing unit that may be used in tracking inventory levels.

Another embodiment of a dispensing unit 30 is illustrated in FIG. 2. Dispensing unit 30 comprises a cabinet 32 having a plurality of retractable drawers 34. Although shown with 12 drawers, the number of drawers may be varied. Conveniently, cabinet 32 rests upon a plurality of wheels 36 which permit the dispensing unit 30 to be wheeled throughout the end user's facility.

Dispensing unit 30 further includes a processor (hidden within cabinet 32) and a keyboard 38 for entering various information into the processor. For example, keyboard 38 may be employed to enter user identification information, requests for item removal, and the like into the processor. Optionally, dispensing unit 10 may further include a second entry device 20 which is connected to the processor and includes a screen 42 which allows the user to scroll through various lists of information in order to select a highlighted item or to enter an item removal request. Conveniently, a printer 44 is provided on cabinet 32 to print various reports generated by the processor. A card reader 46 may also be used to input various information into the processor, such as user or patient identification information.

Figure 3:
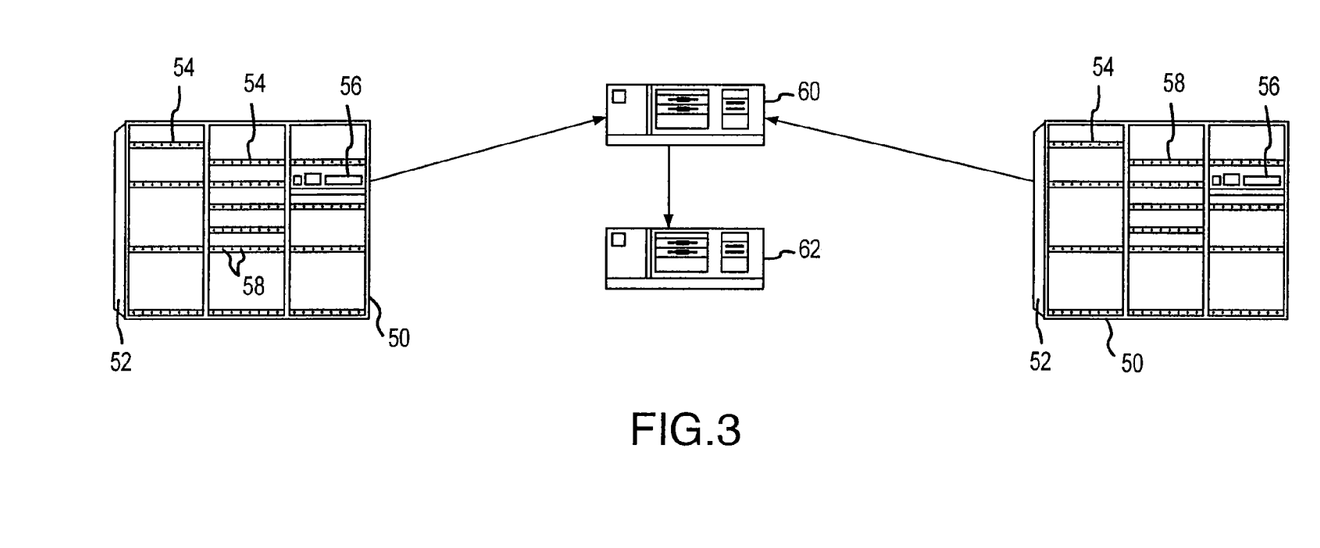
FIG. 3 schematically illustrates a process for polling dispensing units using a server computer and generating a restock request using an administrative computer according to the invention.
Figure 3A:
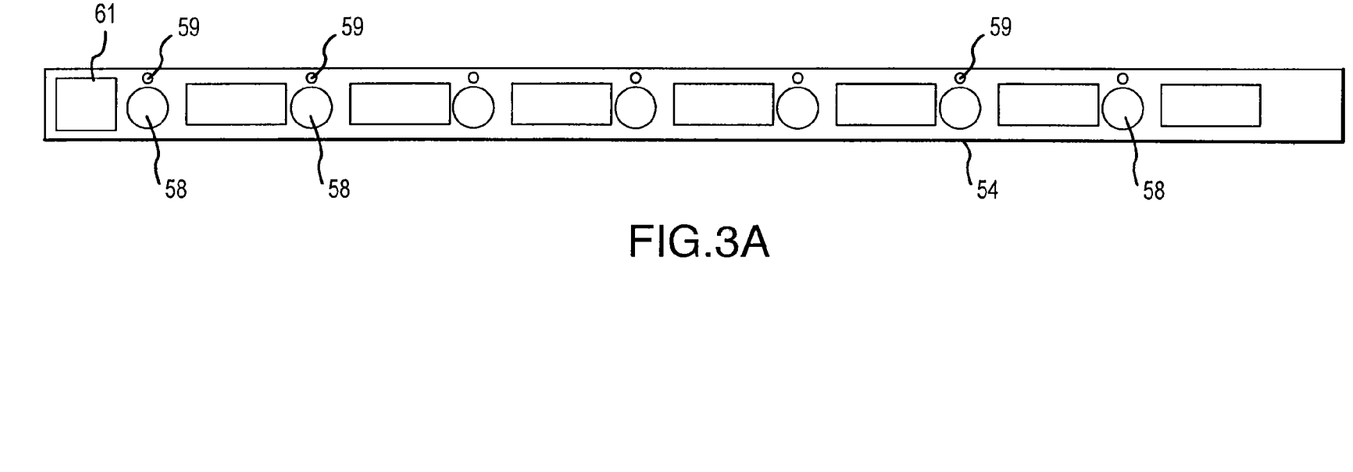
FIG. 3A is a side view of a shelf from one of the dispensing units of FIG. 3.

Referring now to FIGS. 3-14, a system and method for replenishing items in an automated manner will be described. The process utilizes a plurality of dispensing units 50 that are each supplied with multiple items of the same or different types. Dispensing units 50 may be configured in a manner similar to the dispensing units of FIGS. 1 and 2 as just described. In this way, dispensing units 50 may maintain a record of items removed and replenished. For example, dispensing units 50 may be configured as point of use dispensers that are constructed of a cabinet 52 having multiple shelves 54 for storing items. A computer 56 having a processor and memory are provided to maintain a record of the items within cabinet 52 as well as other transaction in data. Removal and replacement of items may be recorded by use of push buttons 58 in a manner similar to that described with other embodiments. In this way, dispensing units 50 may maintain stock levels electronically. For example, shown in FIG. 3A is a side view of one of the shelves 54 having push buttons 58 and a set of lights 59 that are adjacent to the push buttons. One of the lights may be lighted to guide a user to the appropriate location on shelf 54 where a requested item is located. Once the item is removed, the adjacent push button 58 may be pressed a number of times according to the number of items removed. A return item button 61 is used to place dispensing unit 50 into restock mode.

Dispensing units 50 include appropriate electronics to permit access to a server computer 60 over a network. Server computer 60 includes computer code to periodically poll dispensing units 50 over the network to download stock level and transaction information from each of dispensing units. This information is stored in a database that is associated with server computer 60. Server computer 60 is further programmed to aggregate the number and types of items to be restocked into the dispensing units, i.e., to aggregate the demand. Server computer 60 further aggregates the demand by suppliers for the items to be restocked. In this way, ordering information is generated that includes items to be reordered, their quantities, and suppliers of the items. The ordering information is then transmitted over the network to an application computer 62 that operates a hosted procurement application. The hosted procurement application may be operated at a customer site or may be hosted over the Internet.

Figure 4:
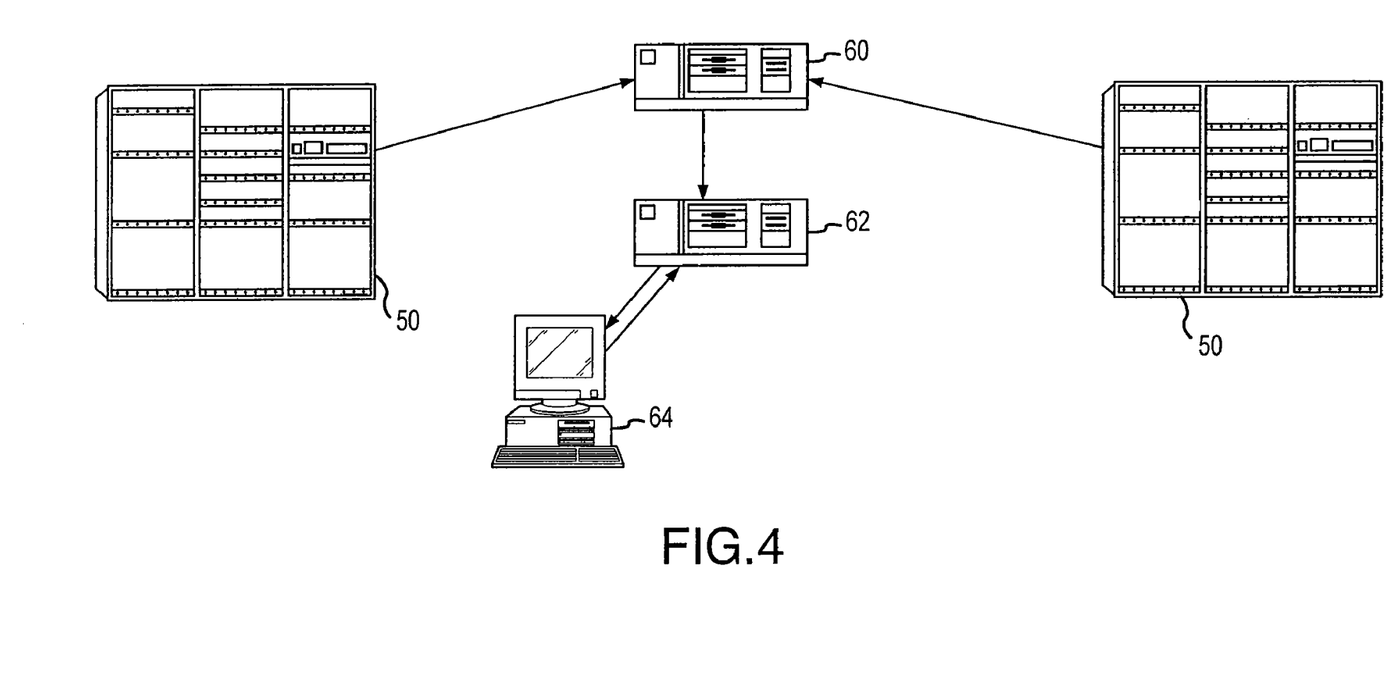
FIG. 4 schematically illustrates a process for accessing a hosted procurement application of the administrative computer of FIG. 3 to approve, modify or cancel an order.

As shown in FIG. 4, a user computer 64 may be used to access the hosted procurement application. User computer 64 may be any type of computer capable of communicating over a network, such as an internal network, the Internet, an intranet, an extranet, a wireless network, or the like. Conveniently, user computer 64 may include a web browser to view web documents transmitted from computer 62.

Such a configuration permits ordering information to be reviewed prior to sending the orders to suppliers. For example, the hosted procurement application may be accessed to permit an end user to approve, modify or reject orders sent from the server computer 60. For instance, the end user may wish to change a supplier and/or a manufacturer of an item, or the quantities being ordered. Further, the user may order additional items that are to be located outside of dispensers 50. For example, the hosted procurement application may provide links to various market sites where additional and/or different items may be electronically ordered. The hosted procurement application also permits end users to electronically post their ordering information. Suppliers may then electronically bid for contracts to supply the items. Further, suppliers may electronically advertise price lists to permit end users to modify their orders if more favorable terms may be obtained.

Figure 5:
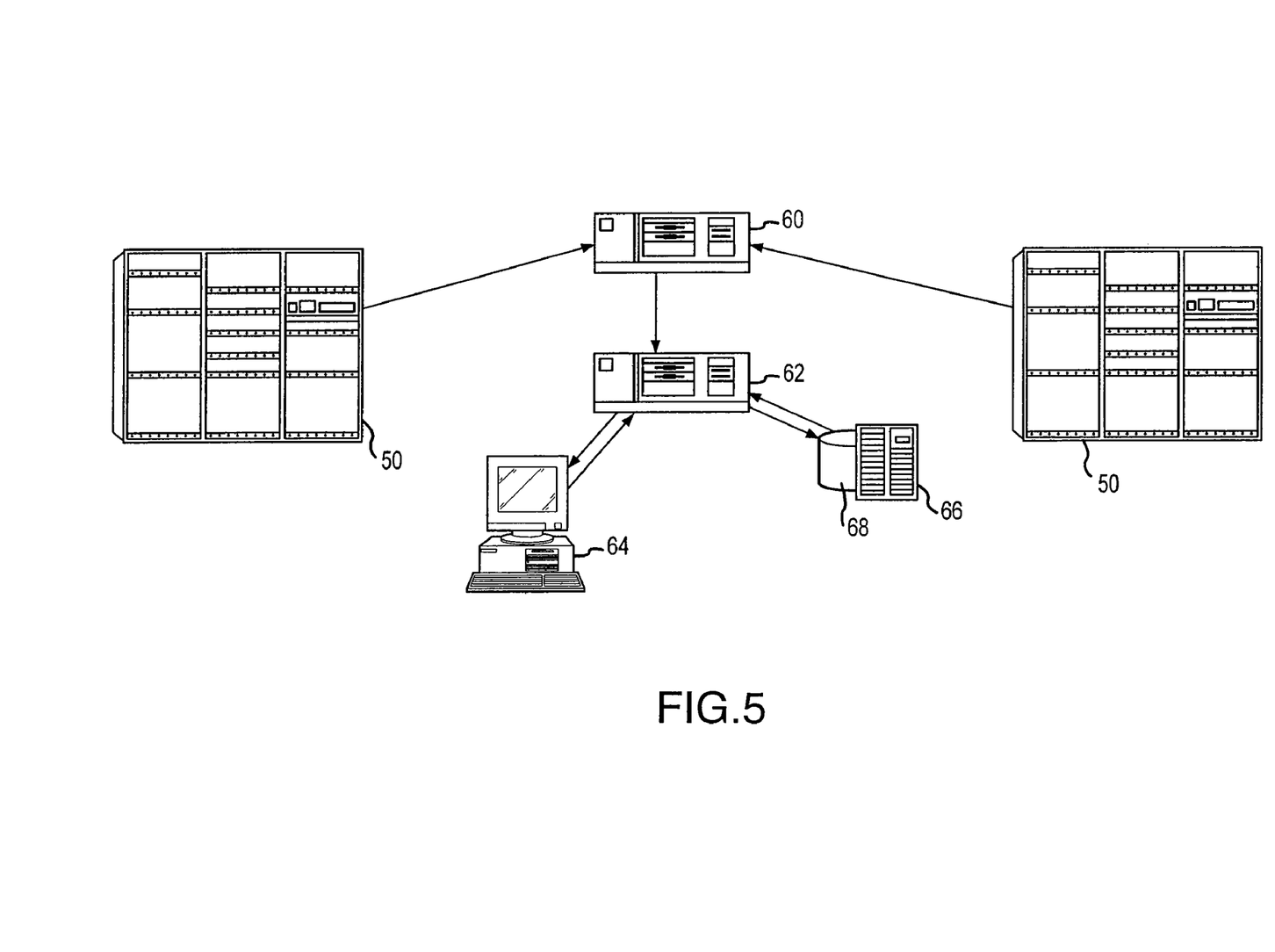
FIG. 5 schematically illustrates an electronic requisition and purchasing system to provide purchase order information for the hosted procurement application of FIG. 4.

Once the order has been approved by the end user, the hosted procurement application contacts an electronic requisition and purchasing (ERP) system 66 having a database 68 with various financial data. ERP system 66 servers as the customer's/user's financial system and is used to approve the purchase order request from the hosted procurement application. ERP system 66 generates an electronic purchase order number which is transmitted to the hosted procurement application.

Figure 6:
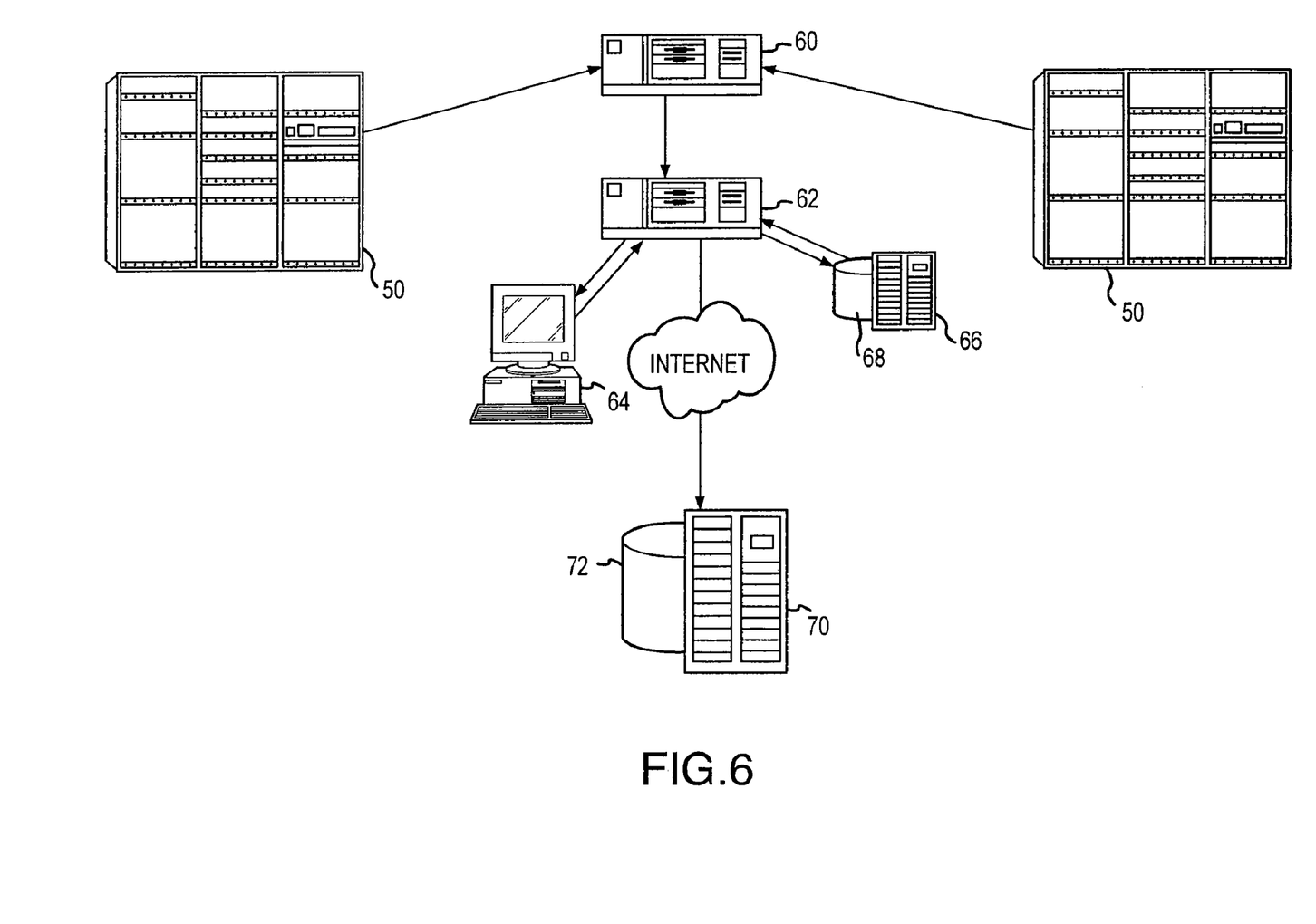
FIG. 6 schematically illustrates an e-business portal that is connectable to multiple market sites and that is configured to receive purchase orders from the hosted procurement application of FIG. 5.

As shown in FIG. 6, the hosted procurement application transmits the orders by supplier with the purchase order number to an e-business portal 70 that has an associated database 72. E-business portal 70 may be configured as a web-based host that aggregates and manages orders by supply and supplier. Further, the host may access various market e-commerce sites through the Internet to obtain pricing and catalog information for the items. In this way, e-business portal 70 may be used to obtain favorable pricing for the items in the purchase order.

Figure 7:
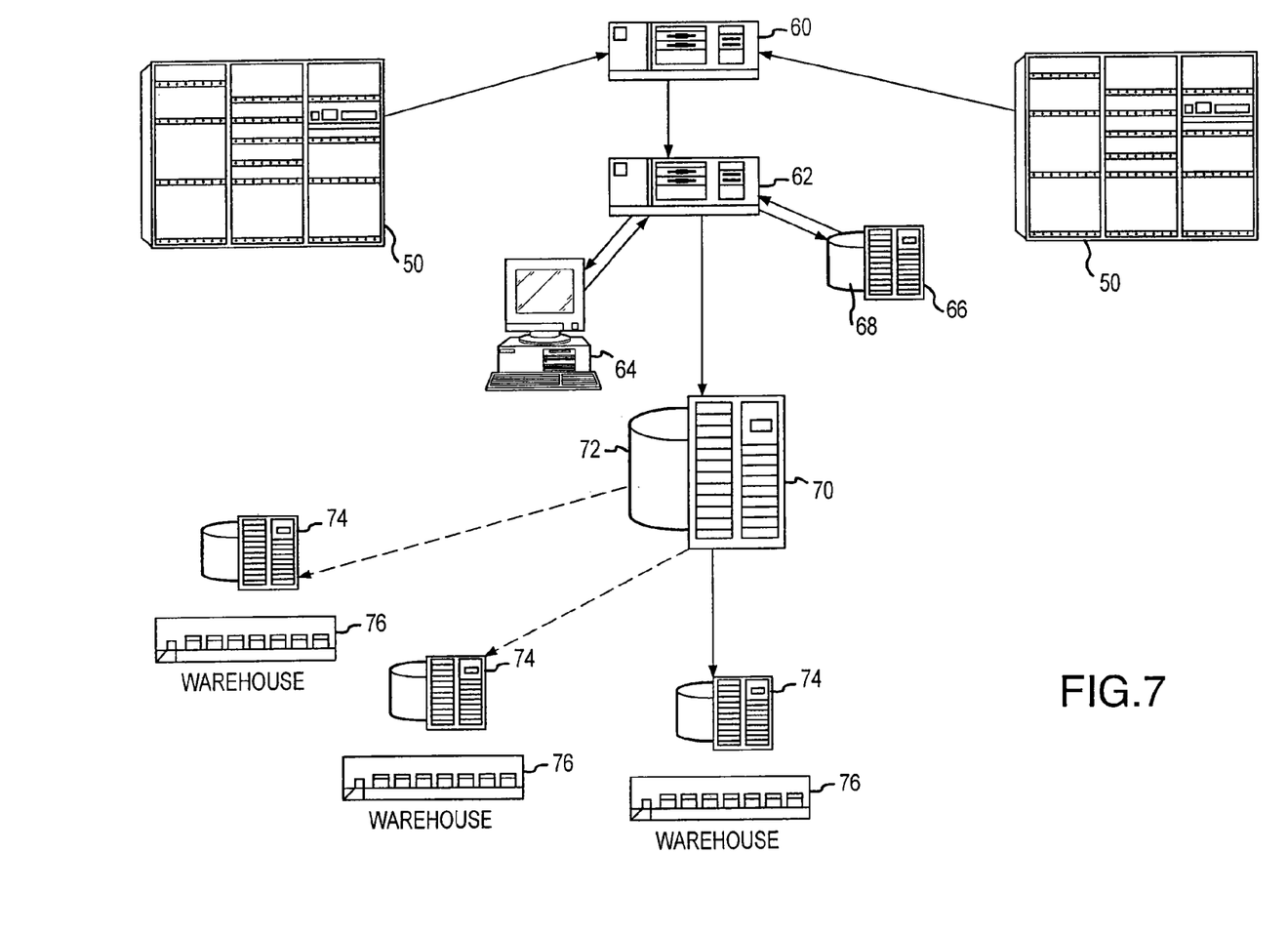
FIG. 7 schematically illustrates the transmission of purchase orders from the e-business portal of FIG. 6 to multiple supplier computers.

As shown in FIG. 7, the host transmits the purchase order number and ordering information to one or more supplier computers 74. This may be accomplished, for example, by transmitting the information over the Internet, an extranet, or the like. Supplier computers 74 are maintained by various suppliers that are responsible for supplying the ordered items. For example, the suppliers may store the items in warehouses 76 until ready for shipping. Hence, by use of supplier computers 74, a supplier is able to electronically receive a purchase order that was produced using an automated system that aggregates demand as items are consumed.

Figure 8:
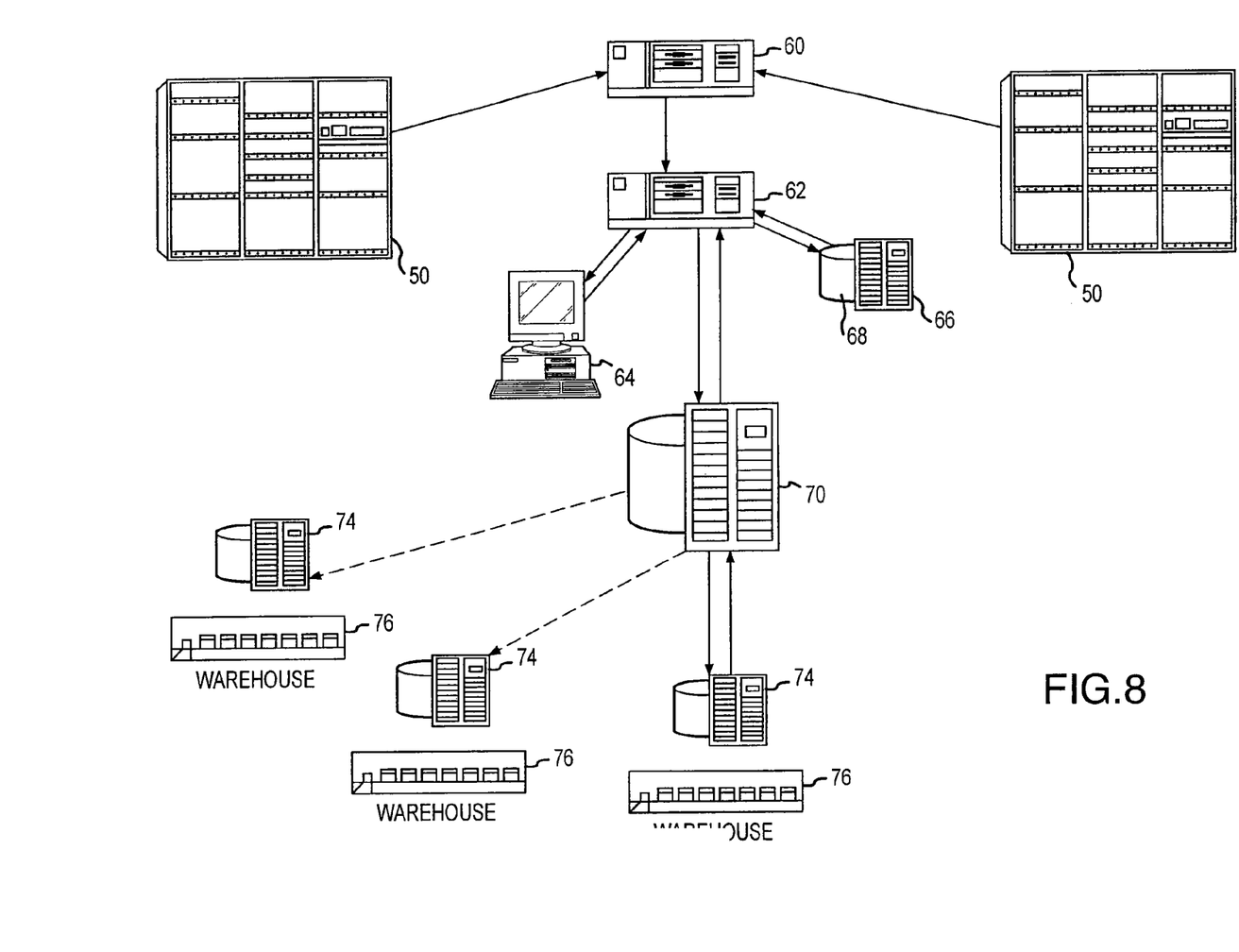
FIG. 8 schematically illustrates the sending of an advanced shipping notice from one of the supplier computers of FIG. 7.

After receiving the purchase order, the supplier determines how the order is to be filled. This information is placed into an advanced shipping notice that is electronically sent back to application computer 62 via e-business portal 70 and the hosted procurement application as shown in FIG. 8. The advanced shipping notice may include information on the types of items being shipped, their quantities and the date of shipment. In some cases, the supplier may not have all of the requested items in stock. In such an event, the advanced shipping notice may indicate the items on back order. When these items are shipped, another advanced shipping notice may be sent.

Figure 9:
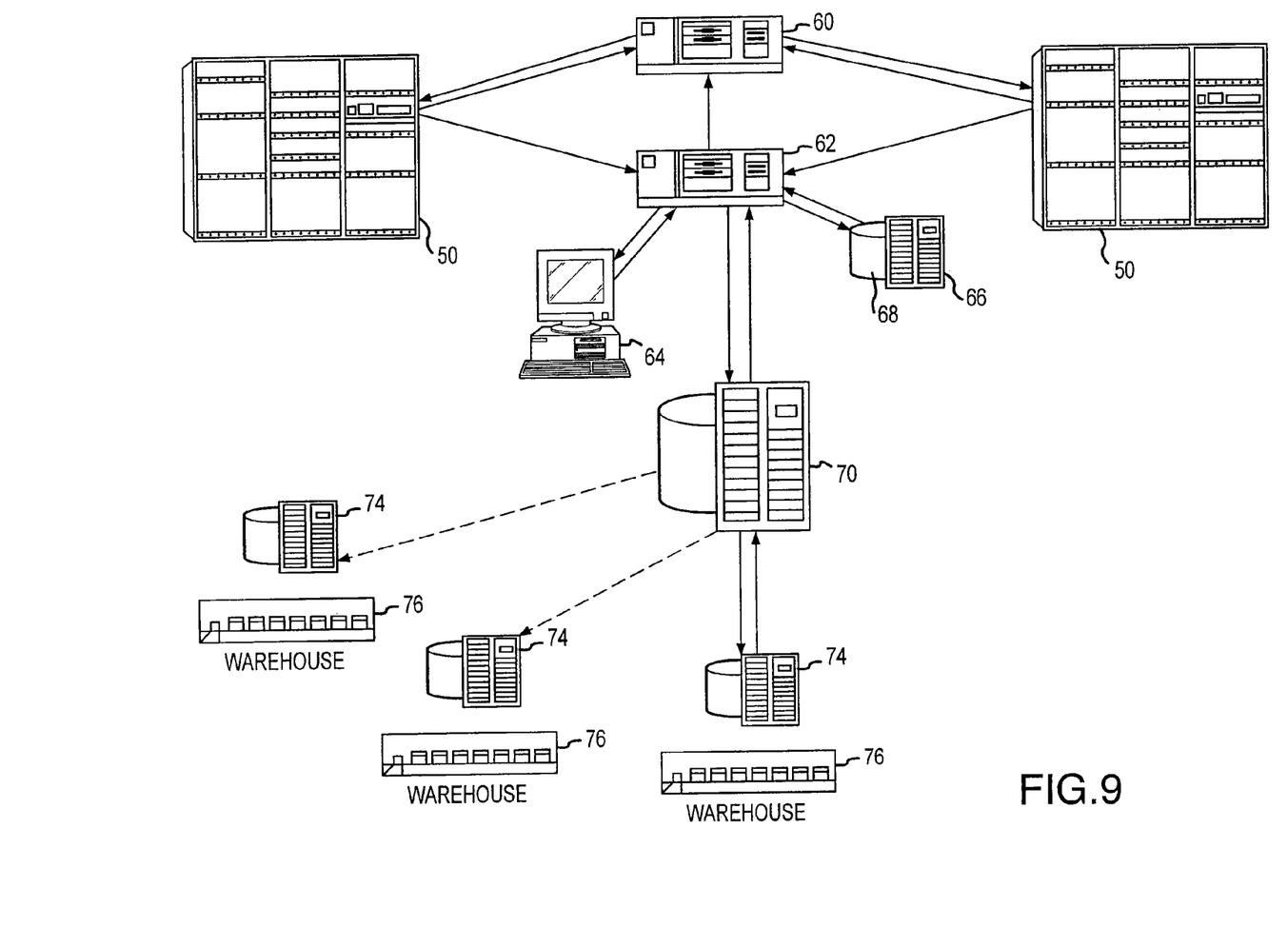
FIG. 9 schematically illustrates the sending of the advanced shipping notice to the dispensing units and the end user computer.

Application computer 62, in turn, sends the advance shipping notice to server computer 60. Server computer 60 includes computer code to send the advanced shipping notice of items to be shipped and restocked to dispensing units 50 as shown in FIG. 9. In this way, dispensing units 50 are apprised of the items that are being shipped from the suppliers. Further, for items that are not intended to be stocked in dispensing units 50, application computer 62 sends the advanced shipping notice to user computer 64 via the Internet, intranet, extranet, or the like. In this manner, the end user is apprised of the items being shipped directly to the end user.

Figure 10:
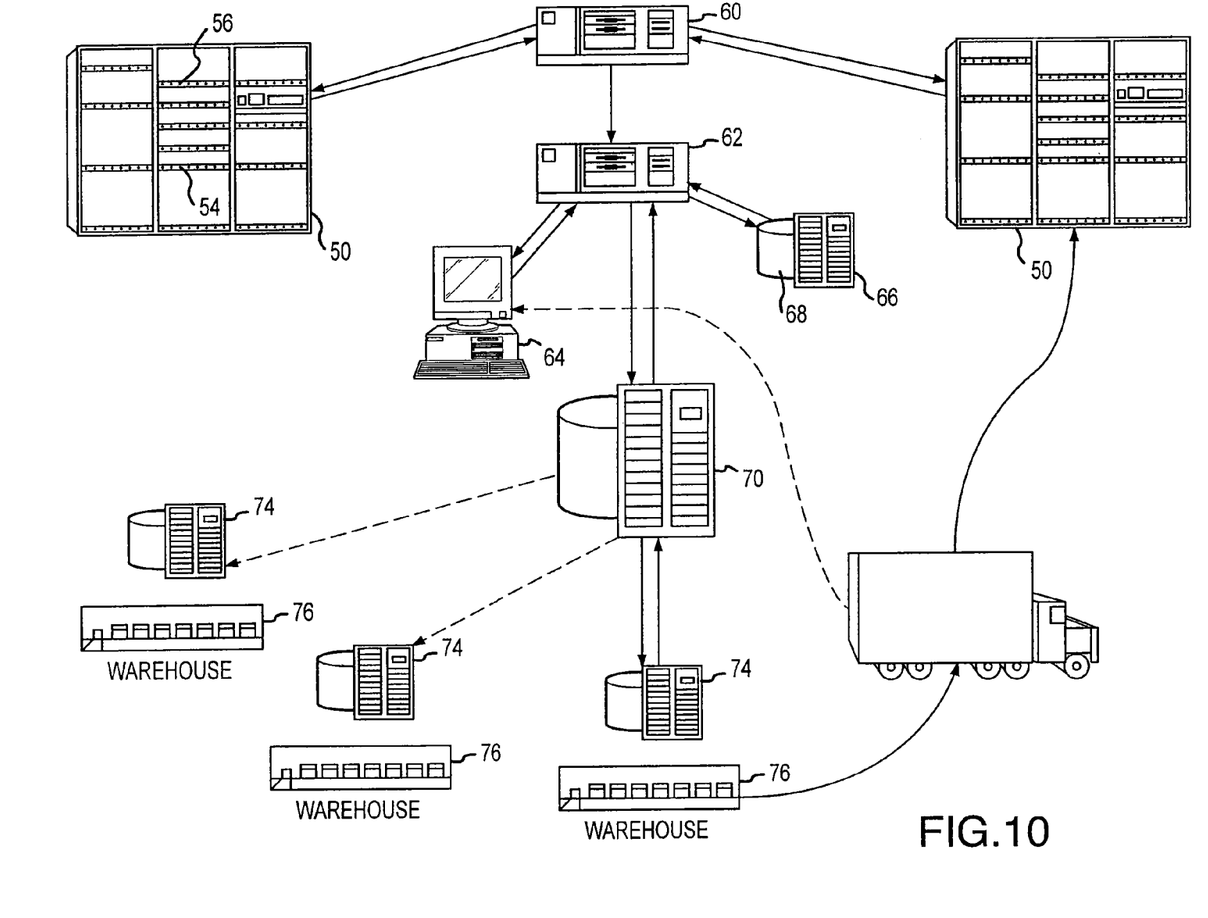
FIG. 10 schematically illustrates the shipping of items from the supplier to the end user or the dispensing units.

As shown in FIG. 10, the supplier ships the item or items against the advanced shipping notice. The shipped items may be restocked into dispensing units 50 by the supplier, an external delivery service, the end user, or the like. As the items are restocked, buttons 58 are pressed or bar-codes are read to produce a record of the types and quantities of items restocked. This information is then stored by each dispensing unit. For items that are not stocked into dispensing units 50, the supplier may ship the items directly to the end user.

Figure 11:
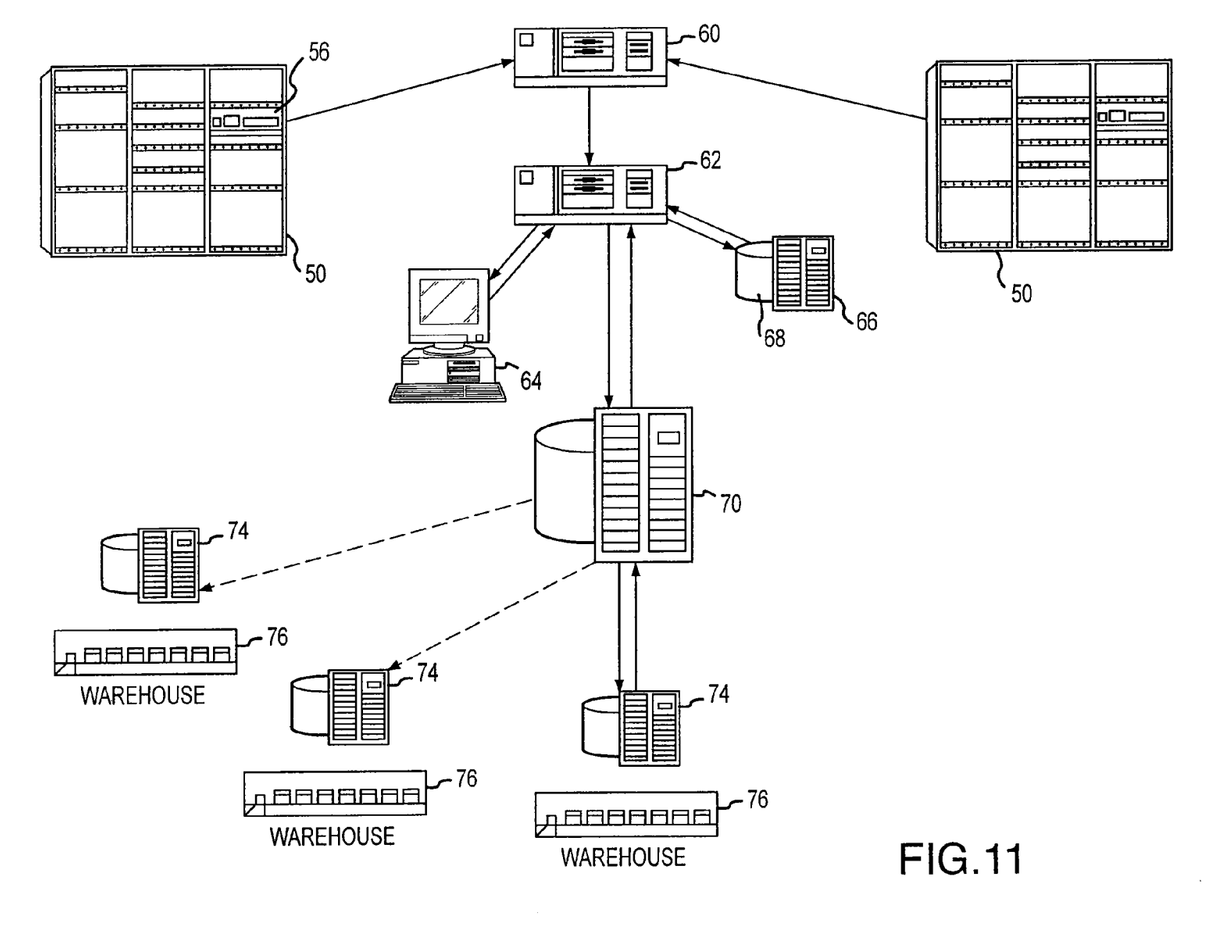
FIG. 11 schematically illustrates the sending of an electronic receipt to the server computer.

As previously described, each dispensing unit 50 has a record of the advanced shipping notice from the supplier. As shown in FIG. 11, computer 56 is used to synchronize the items restocked with the advanced shipping notice. In this way, any discrepancies between the items actually shipped as compared to the items that were expected to be shipped may be determined in an automated manner. Each dispensing unit 50 then generates an electronic receipt using computer 56. The electronic receipt contains a confirmation of receipt of the items restocked as compared to the advanced shipping notice. The receipt is then transferred over the network to server computer 60. For items that are not stocked in dispensing units 50, the end user may generate an electronic receipt using computer 64. This receipt is then transferred to application computer 62.

Figure 12:
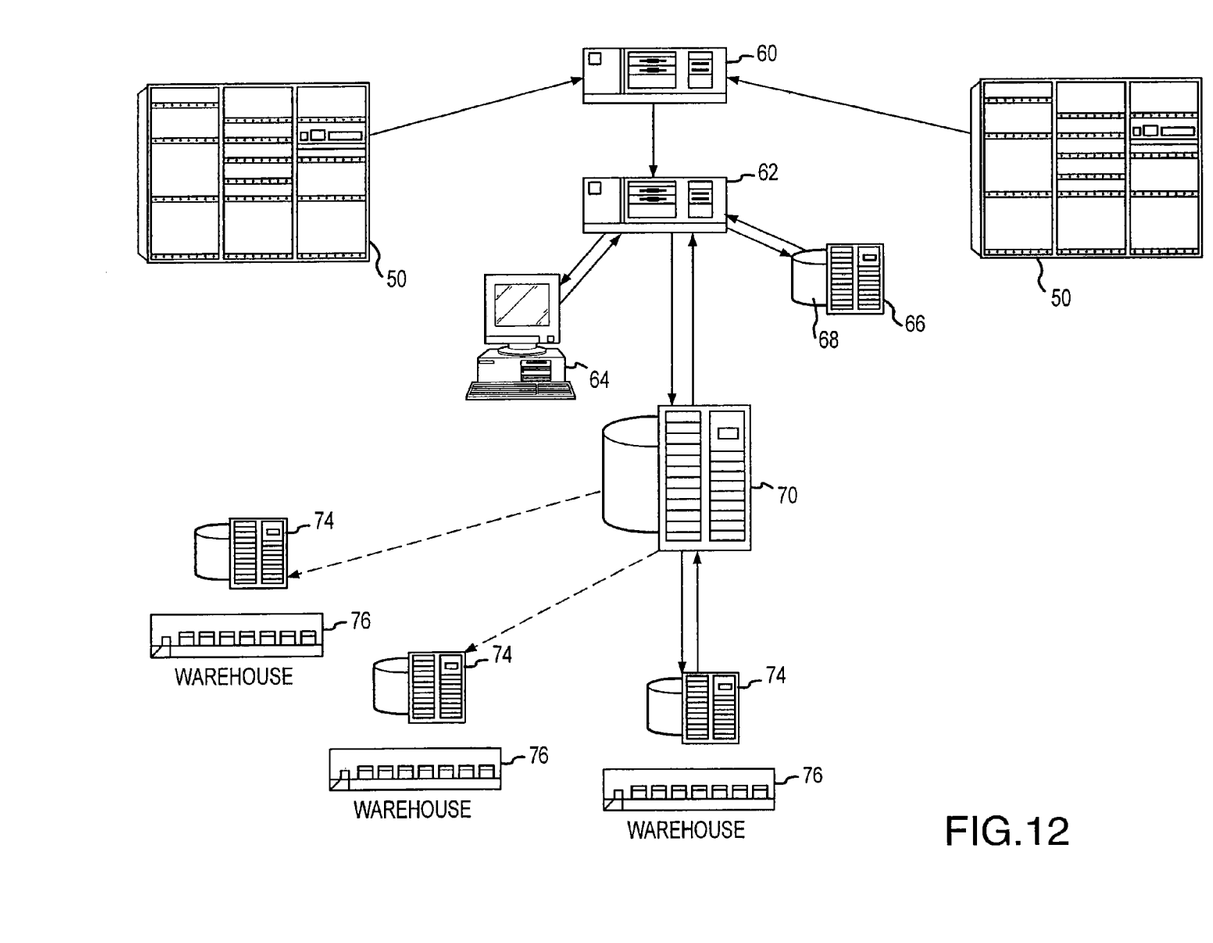
FIG. 12 schematically illustrates the sending of the electronic receipt to the supplier computers and to the electronic requisition and purchasing system.

Server computer 60 forwards the electronic receipt from dispensing units 50 to application computer 62 where the hosted procurement application sends the electronic receipt to supplier computer 74 via e-business portal 70 as shown in FIG. 12. The electronic receipt is also forwarded to ERP system 66 for comparison with the original purchase order. In this way, the customer's accounting department automatically receives an electronic confirmation of shipment for comparison against the purchase order. Further, the supplier automatically receives the same electronic confirmation.

Figure 13:
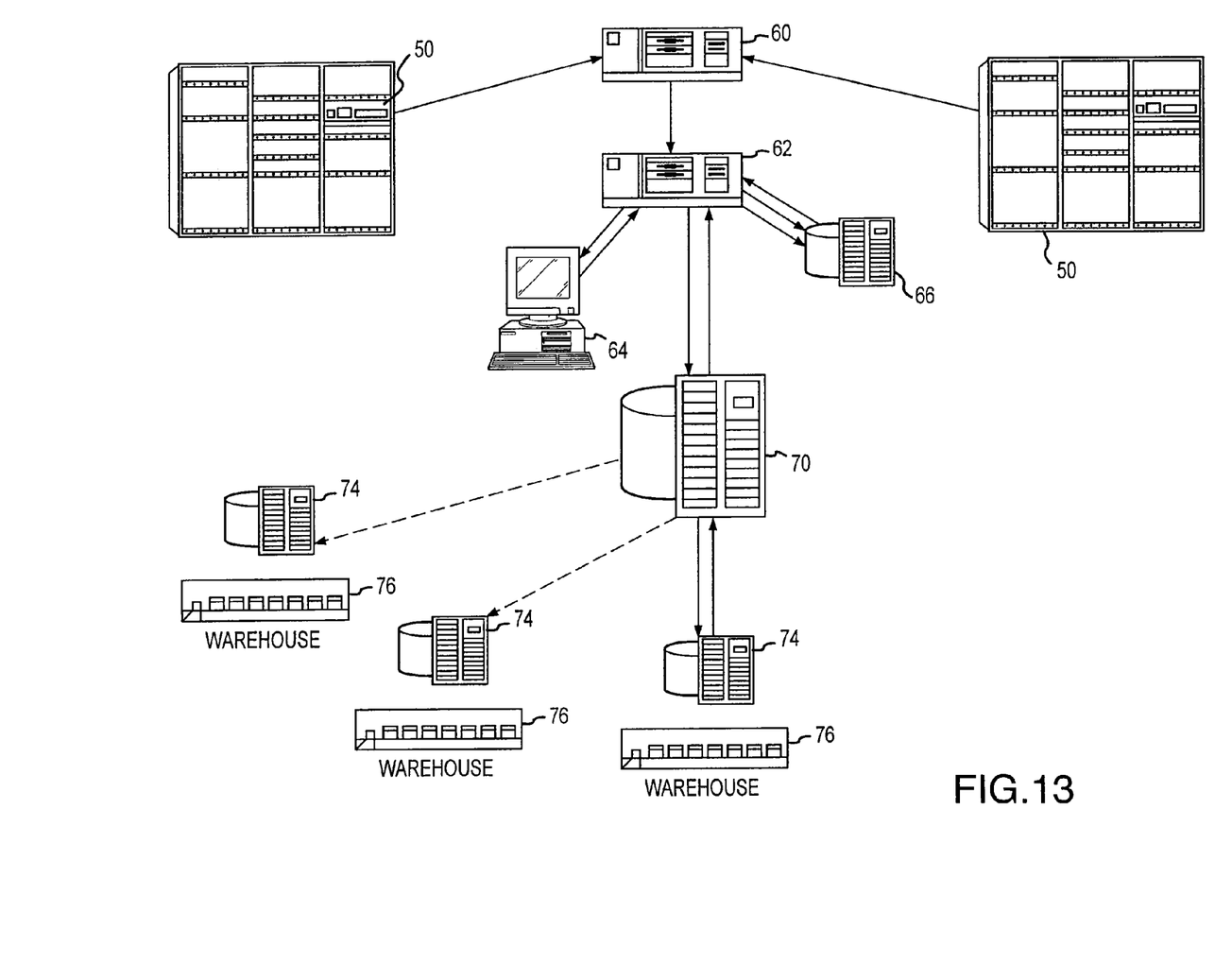
FIG. 13 schematically illustrates the sending of an electronic invoice to the electronic requisition and purchasing system for payment generation.

With the electronic receipt, supplier computer 74 generates and sends an electronic invoice over the network back through e-business portal 70 to application computer 62 as shown in FIG. 13. The hosted procurement application then transmits the electronic invoice to the end user's ERP system 66. ERP system 66 then issues payment in the form of a check, money transfer, or the like to the supplier. Hence, the invention provides for the automated generation of ordering information as items are removed for consumption. The invention also provides a convenient way to approve or modify the order and to then electronically transmit the order request to an ERP system for purchase order generation. Suppliers are able to receive electronic purchase orders and to electronically send advanced shipping notices. This permits automated confirmations of shipment to be generated and sent back to the suppliers for generation of an electronic invoice. This invoice may then be used to provide payment.

The invention has now been described in detail for purposes of clarity and understanding. However, it will be appreciated that certain changes and modifications may be practiced within the scope of the appended claims.

What is claimed is:

1. A method to facilitate supplying of items into a plurality of dispensing units, the method comprising:
receiving at a server computer restocking information from a plurality of dispensing units, wherein the restocking information includes at least one of stock level or transaction information for items to be restocked into the dispensing units;
generating ordering information for the items to be restocked using the server computer based on the restocking information;
electronically sending the ordering information from the server computer to one or more supplier computers to permit restock items to be ordered;
transmitting advanced shipping notice information from the server computer to the dispensing units to apprise the dispensing units of the items and quantities to be shipped for restocking into the dispensing units; and
restocking the shipped items into one of the dispensing units, wherein the restocking step comprises placing the dispensing unit into restocking mode, placing the shipped items into the dispensing unit and touching item buttons corresponding to the items placed into the dispensing unit to compare the record of restocked items with the advanced shipping notice, to acknowledge the quantity restocked is equal to the quantity represented in the advance shipping notice, and to produce a record of restocked items.

2. A method as in claim 1, wherein the restocking step comprises identifying the items to the dispensing unit by scanning bar-codes associated with the items.

3. A method as in claim 1, further comprising receiving at the server computer an electronic receipt from the dispensing units of items that were restocked into the dispensing units as compared to the advanced shipping notice.

4. A method as in claim 3, further comprising electronically sending the receipt from the server computer to supplier computers and to an electronic requisition and purchasing system for payment.

5. A method as in claim 1, wherein the ordering information generating step further comprises determining supplier information for the items to be ordered using the server computer.

6. A system for supplying items to a plurality of dispensing units, the system comprising:
a plurality of dispensing units that each hold a plurality of at least one type of item, wherein the units have a processor and a memory for storing a record of inventory levels of each item;
a server computer that is connectable to the dispensing units over a network to permit restocking information to be transmitted from the dispensing units to the server computer, wherein the restocking information includes at least one of stock level or transaction information for each item, wherein the server computer further includes code to generate ordering information for the items to be restocked based on the restocking information, and code to electronically send the ordering information to one or more supplier computers to order items to be restocked into the dispensing units;
wherein the server computer includes code to electronically send advanced shipping notice information to the dispensing units to apprise the dispensing units of the items and quantities to be shipped for restocking into the dispensing units;
wherein restocking the dispensing units comprises placing the dispensing unit into restocking mode, placing the shipped items into the dispensing unit and touching item buttons corresponding to the items placed into the dispensing unit to compare the record of restocked items with the advanced shipping notice, to acknowledge the quantity restocked is equal to the quantity represented in the advance shipping notice, and to produce a record of restocked items.

7. A system as in claim 6, wherein the server computer further includes code to poll the dispensing units over the network to obtain the quantities of the items to be restocked.

8. A system as in claim 6, wherein the server computer further includes code to generate the ordering information by determining supplier information for the items to be ordered.

9. A system as in claim 6, wherein the server computer includes code to electronically send the ordering information to an application computer having a hosted procurement application.

10. A system as in claim 9, further comprising a user computer having a display screen, wherein the user computer is configured to access the hosted procurement application to view the ordering information on the display screen, and wherein the hosted procurement application is configured to produce one or more pages on the display screen of the user computer to permit the ordering information to be approved, modified or canceled.

11. A system as in claim 10, further comprising code to send the ordering information from the application computer to an electronic requisition and purchasing system, and wherein the electronic requisition and purchasing system is configured to generate one or more electronic purchase order numbers and to electronically send the purchase order number to the application computer.

12. A system as in claim 11, wherein the application computer includes code to electronically send the purchase order number and the supplier information from the application computer to a business portal computer, and wherein the business portal computer includes code to electronically send the purchase order number to the supplier computer based on the supplier information.

13. A system as in claim 12, wherein the application computer includes code to electronically send information contained in the advanced shipping notice to the user computer for items that are not stocked in the dispensing units.

14. A system as in claim 12, wherein the dispensing units are configured to reconcile any restocked items with the advanced shipping notice and to electronically send a confirmation receipt to the server computer.

15. A system as in claim 14, wherein the server computer includes code to electronically send the receipt to the supplier computers and to the electronic requisition and purchasing system.

16. A system as in claim 15, wherein the supplier computers are configured to generate an electronic invoice based on the receipt, and to electronically send the invoice to the business portal computer and the application computer.

17. A system as in claim 16, wherein the application computer is configured to electronically transmit the electronic invoice to the electronic requisition and purchasing system for payment generation.

* * * * *